US006899577B2

(12) United States Patent
Yasuda et al.

(10) Patent No.: US 6,899,577 B2
(45) Date of Patent: May 31, 2005

(54) OUTBOARD MOTOR SHIFT MECHANISM

(75) Inventors: Toyoshi Yasuda, Wako (JP); Hiroshi Watabe, Wako (JP); Hideaki Takada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/797,043

(22) Filed: Mar. 11, 2004

(65) Prior Publication Data

US 2004/0180586 A1 Sep. 16, 2004

(30) Foreign Application Priority Data

Mar. 14, 2003 (JP) ....................................... 2003-070615
Mar. 14, 2003 (JP) ....................................... 2003-070616

(51) Int. Cl.[7] .......................... B60K 41/00; B63H 21/21
(52) U.S. Cl. ........................................... 440/86; 192/35
(58) Field of Search ....................... 440/75, 86; 192/21, 192/35, 44, 45, 51

(56) References Cited

U.S. PATENT DOCUMENTS 5,230,643 A * 7/1993 Kanno .......................... 440/86
5,911,291 A * 6/1999 Suetake et al. ............... 192/35
6,129,599 A * 10/2000 Hallenstvedt et al. ......... 440/86
6,485,340 B1 * 11/2002 Kolb et al. ................... 440/86
6,769,524 B2 * 8/2004 Yasui et al. ................... 192/35

FOREIGN PATENT DOCUMENTS

JP 10-184402 7/1998
JP 2000-280983 10/2000

* cited by examiner

*Primary Examiner*—S. Joseph Morano
*Assistant Examiner*—Lars A. Olson
(74) *Attorney, Agent, or Firm*—Westerman, Hattori, Daniels & Adrian, LLP

(57) ABSTRACT

In a shift mechanism for an outboard motor mounted on a stern of a boat and having an internal combustion engine and a propeller connected by a propeller shaft to the engine to propel the boat, a vertical shaft connected to the engine and transmitting an output of the engine to the propeller shaft is divided into two shaft halves and an electromagnetic clutch is provided to connect/disconnect the shaft halves. An electronic controller is provided to operate the electromagnetic clutch to disconnect the vertical shaft halves until one of the forward and reverse gears corresponding to the instruction to shift has been engaged with the propeller shaft, and then operate it to connect the shaft halves after the one of the forward gear and the reverse gear has been engaged with the propeller shaft. Alternatively, two electromagnetic clutches are provided to engage the forward or reverse gear with the propeller shaft, and the controller controls operation of the electromagnetic clutches in response to the instruction to shift such that corresponding one of the forward and reverse gears is engaged with the propeller shaft. With this, it becomes possible to decrease an impact occurring at the beginning of shift, thereby enabling to prevent the outboard motor from vibrating, while enabling to improve the operation feeling and facilitate maintenance, and to avoid a problem regarding space utilization.

8 Claims, 14 Drawing Sheets

OUTBOARD MOTOR SHIFT MECHANISM

BACKGROUND OF THE INVENTION

1. Field of the Invention

This invention relates to a shift mechanism for an outboard motor.

2. Description of the Related Art

In outboard motors, an output of the internal combustion engine mounted thereon is transmitted to a forward gear or a reverse gear through a vertical shaft and is then transmitted to a propeller shaft. A shift is usually performed by moving a shift rod having a cam at its distal end in the lengthwise direction (vertical direction) to slide a shift slider in the horizontal direction such that a shifter clutch is switched from its neutral position to a forward position where it engages with the forward gear or a reverse position where it engages with the reverse gear.

Alternatively, the shift rod is provided with a rod pin at a position eccentric from the rod center axis in such a way that the rod pin is displaced to slide the shift slider such that the shifter clutch is engaged with the forward gear or the reverse gear to effect the shift.

The engagement of this shifter clutch and the forward/reverse gears is usually made by meshing projections formed on the shifter clutch with mating projections formed on the gears. Thus, most of the outboard motor shift mechanisms are usually constituted as a meshed type of clutch including the shifter clutch and forward/reverse gear projections to be meshed therewith, i.e., the so-called "dog clutch". In this type of clutch, unless the rotational speed of drive shaft side (forward/reverse gears) and that of driven shaft side (propeller shaft that rotates integrally with the shifter clutch) are in synchronism with each other, projections formed thereon do not fit into mated recesses smoothly at the beginning of shift and an impact or shock may sometimes happen. If this happens, the outboard motor may vibrate and in addition, the drive train (including the projections, the vertical shaft, etc.) may have excessive stress.

In order to avoid this problem, it has been known to mitigate such an excessive stress by dividing the vertical shaft (drive shaft) into two shaft halves and by connecting them through an elastic member, as disclosed in Japanese Laid-Open Patent Application No. 2000-280983.

However, this also has disadvantages that it merely proposes mitigating the stress (that acts on the drive train) by the elastic member. In other words, since this technique does not aim to directly decrease the impact itself, it leaves much to be improved.

Aside from the above, when the shift rod is to be operated manually, since the operator tends to have an unpleasant operation "feel" owing to, for instance, heavy load, it has hitherto been proposed installing an actuator in the outboard motor and connecting it with the shift rod through a cable or a link mechanism to power-assist the driving of the shift rod, i.e. the shift, as taught in Japanese Patent No. 2817738.

The add-on system using such an actuator has disadvantages that the operation feel is degraded by plays in additional movable members in the complicated structure, that it makes maintenance tedious, and that it needs a space in the outboard motor.

SUMMARY OF THE INVENTION

One aspect of the present invention is therefore to overcome the foregoing issues by providing a shift mechanism for an outboard motor that can decrease an impact occurring at the beginning of shift, thereby enabling to prevent the outboard motor from vibrating.

Another aspect of the present invention is to provide a shift mechanism for an outboard motor that can improve the operation feeling and facilitate maintenance, while avoiding a problem regarding space utilization.

The present invention provides, in its first aspect, a shift mechanism for an outboard motor mounted on a stern of a boat and having an internal combustion engine at its upper portion and a propeller at its lower portion that is powered by the engine to propel the boat, comprising: a propeller shaft connected to the propeller; a forward gear and a reverse gear rotating the propeller shaft in a forward direction or in a reverse direction opposite to the forward direction, when engaged with the propeller shaft in response to a rotation of a shift rod; a vertical shaft connected to the engine and transmitting an output of the engine to the propeller shaft through the forward gear or the reverse gear when the forward gear or the reverse gear is engaged to the propeller shaft; the vertical shaft being divided into a plurality of shaft members; an electromagnetic clutch connecting/disconnecting the shaft members of the vertical shaft; a sensor generating a signal indicative of an instruction to shift inputted by an operator; and a controller controlling the operation of the electromagnetic clutch in response to the instruction to shift such that one of the forward gear and the reverse gear corresponding to the instruction to shift is engaged with the propeller shaft.

The present invention provides, in its second aspect, a shift mechanism for an outboard motor mounted on a stern of a boat and having an internal combustion engine at its upper portion and a propeller at its lower portion that is powered by the engine to propel the boat, comprising: a propeller shaft connected to the engine and the propeller; a forward gear and a reverse gear rotating the propeller shaft in a forward direction or in a reverse direction opposite to the forward direction, when engaged with the propeller shaft; a first electromagnetic clutch engaging the forward gear with the propeller shaft; a second electromagnetic clutch engaging the reverse gear with the propeller shaft; a sensor generating a signal indicative of an instruction to shift inputted by an operator; and a controller controlling to operate the first and second electromagnetic clutches in response to the instruction to shift such that one of the forward gear and the reverse gear corresponding to the instruction to shift is engaged with the propeller shaft.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

An outboard motor shift mechanism according to a first embodiment of the invention will now be explained with reference to the attached drawings.

Figure 1:
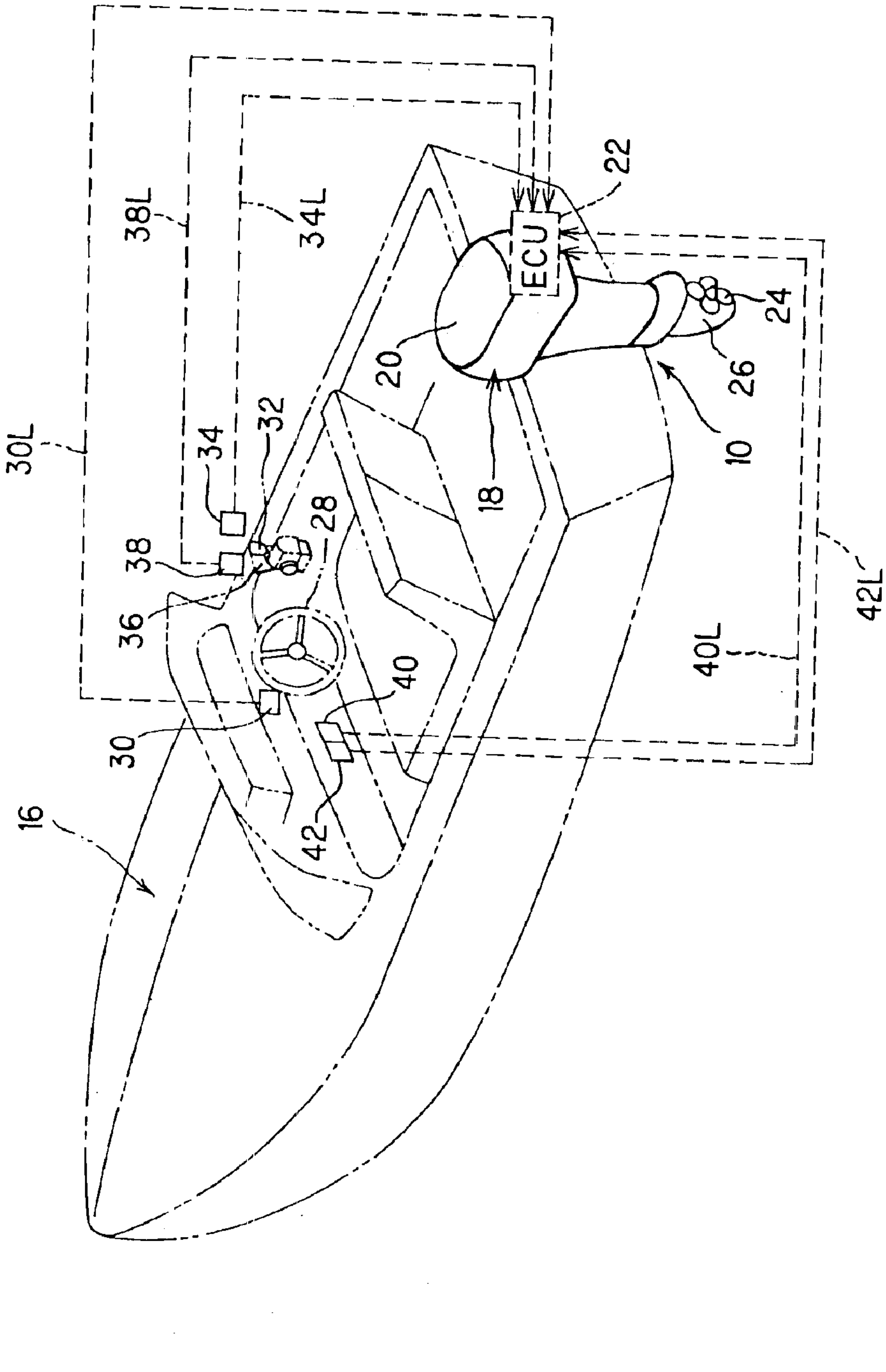
FIG. 1 is an overall schematic view of an outboard motor shift mechanism according to an embodiment of the invention.
Figure 2:
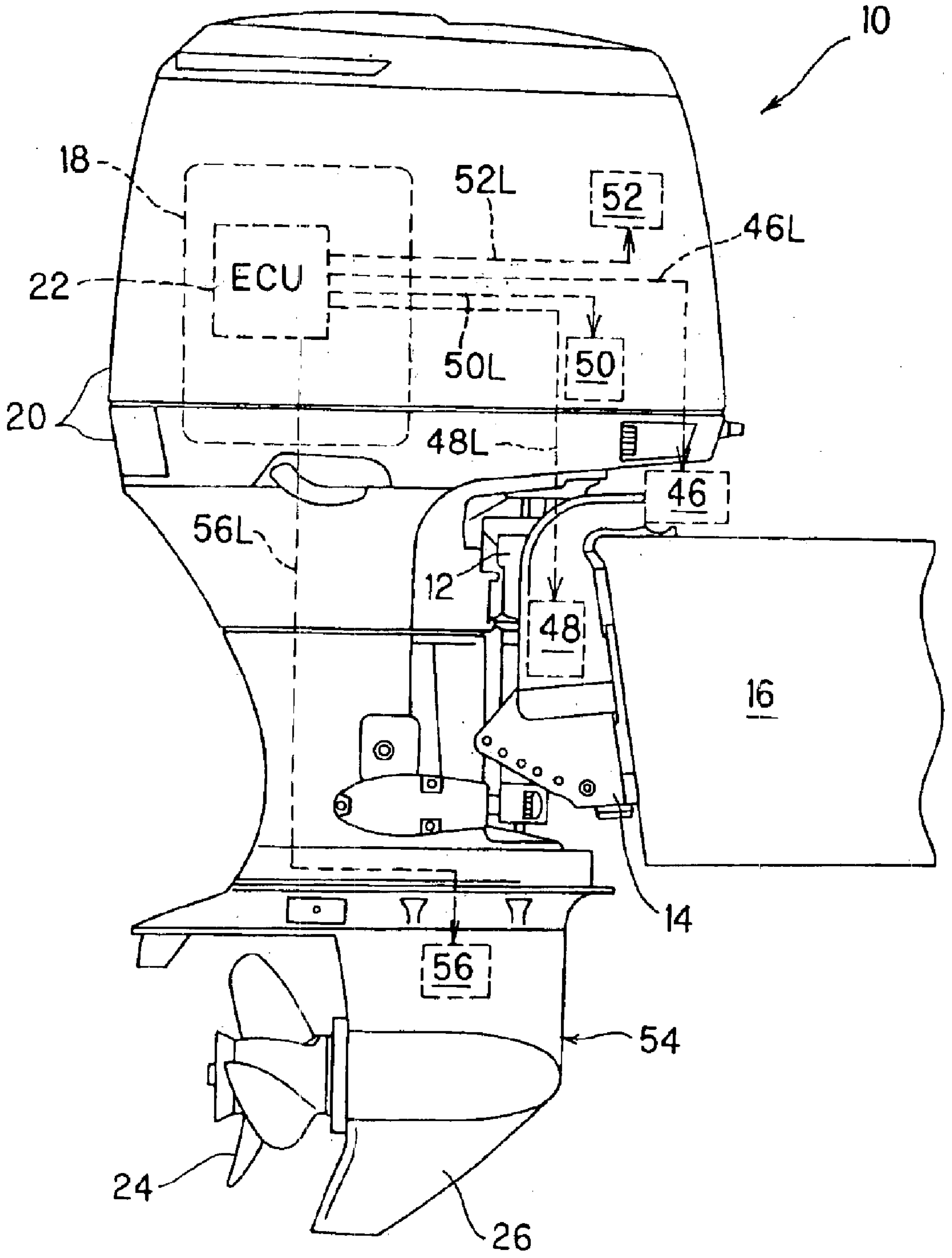
FIG. 2 is an explanatory side view of a part of FIG. 1.

FIG. 1 is an overall schematic view of the outboard motor shift mechanism according to the embodiment, and FIG. 2 is an explanatory side view of a part of FIG. 1.

Reference numeral 10 in FIGS. 1 and 2 designates an outboard motor built integrally of an internal combustion engine, propeller shaft, propeller and other components. As illustrated in FIG. 2, the outboard motor 10 is mounted on the stern of a boat (hull) 16 via a swivel case 12 (that rotatably accommodates or houses a swivel shaft (not shown)) and stern brackets 14 (to which the swivel case 12 is connected), to be rotatable about the vertical and horizontal axes.

The outboard motor 10 is equipped with an internal combustion engine 18 at its upper portion. The engine 18 is a spark-ignition, in-line four-cylinder gasoline engine with a displacement of 2,200 cc. The engine 18, located inside the outboard motor 10, is enclosed by an engine cover 20 and positioned above the water surface. An electronic control unit (ECU) 22 constituted of a microcomputer is installed near the engine 18 enclosed by the engine cover 20.

The outboard motor 10 is equipped at its lower part with a propeller 24 and a rudder 26 adjacent thereto. The rudder 26 is fixed near the propeller 24 and does not rotate independently. The propeller 24, which operates to propel the boat 16 in the forward and reverse directions, is powered by the engine 18 through a crankshaft, drive shaft, gear mechanism and shift mechanism (none of which is shown).

As shown in FIG. 1, a steering wheel (steering device) 28 is installed near the operator's seat of the boat 16. A steering angle sensor 30 is installed near the steering wheel 28. The steering angle sensor 30 is made of a rotary encoder and outputs a signal in response to the turning of the steering wheel 28 manipulated or inputted by the operator. A throttle lever 32 is mounted on the right side of the operator's seat, and a throttle lever position sensor 34 is installed near the throttle lever 32 and outputs a signal in response to the position of the throttle lever 32 manipulated by the operator.

A shift lever 36 is mounted on the right side of the operator's seat near the throttle lever 32, and a shift lever position sensor 38 is installed near the shift lever 36 and outputs a signal in response to the position of the shift lever 36 manipulated by the operator (an instruction to shift). Specifically, the sensor 38 outputs a signal indicative of corresponding one of a neutral position, a forward position and a reverse position selected by the operator.

A power tilt switch 40 for regulating the tilt angle and a power trim switch 42 for regulating the trim angle of the outboard motor 10 are also installed near the operator's seat. These switches output signals in response to tilt-up/down and trim-up/down instructions inputted by the operator. The outputs of the steering angle sensor 30, throttle lever position sensor 34, shift lever position sensor 38, power tilt switch 40 and power trim switch 42 are sent to the ECU 22 over signal lines 30L, 34L, 38L, 40L and 42L.

Around the swivel case 12 and the stern brackets 14, there are installed a steering actuator, i.e., an electric motor (for steer) 46, and a conventional power tilt-trim unit 48 to regulate the tilt angle and trim angle of the outboard motor 10, that are connected to the ECU 22 through signal lines 46L and 48L. Inside the engine cover 20, there are installed an electric motor (for shift) 50 and another electric motor (for throttle) 52 that are connected to the ECU 22 through the signal lines 50L and 52L.

In a gear case 54 located at the lower portion of the outboard motor 10, a vertical shaft (not shown) extends downwards to transmit the output of the engine 18 to a propeller shaft (not shown). The vertical shaft is partially housed in the gear case 54 and an electromagnetic clutch 56 is installed at a location midway of the vertical shaft. The rudder 26 is integrally formed with the gear case 54.

In response to the outputs of these sensors and switches, the ECU 22 operates the electric motor 46 (for steer) to steer the outboard motor 10, and operates the power tilt-trim unit 48 to regulate the tilt angle and trim angle of the outboard motor 10. It also operates the electric motor 50 (for shift) and the electromagnetic clutch 56 to conduct the shift (i.e., to change the rotational direction of the propeller 24 or cut off the transmission of engine power to the propeller 24), and operates the electric motor 52 (for throttle) to regulate the engine speed NE of the engine 18.

Figure 3:
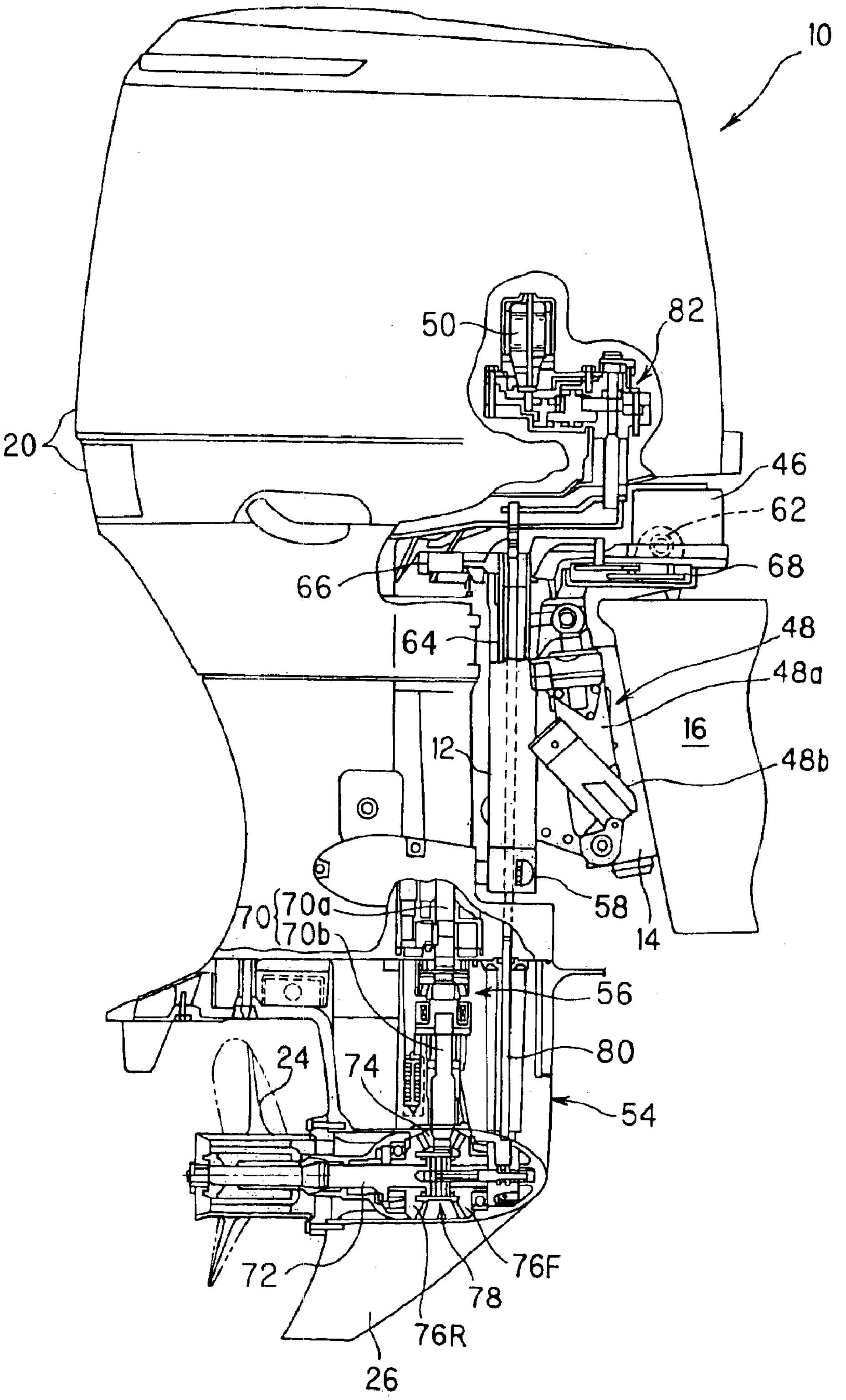
FIG. 3 is an enlarged explanatory side view of FIG. 2.

FIG. 3 is an enlarged partially-cutaway side view of FIG. 2.

As illustrated in FIG. 3, the power tilt-trim unit 48 is equipped with one hydraulic cylinder 48*a* for tilt angle regulation and, constituted integrally therewith, two hydraulic cylinders 48*b* for trim angle regulation (only one shown). One end (cylinder bottom) of the tilt hydraulic cylinder 48*a* is fastened to the stern brackets 14 and through it to the boat 16 and the other end (piston rod head) thereof abuts on the swivel case 12. One end (cylinder bottom) of each trim hydraulic cylinder 48*b* is fastened to the stern brackets 14 and through it to the boat 16, similarly to the one end of the tilt hydraulic cylinder 48*a*, and the other end (piston rod head) thereof abuts on the swivel case 12.

The swivel case 12 is connected to the stern brackets 14 through a tilting shaft 62 to be relatively displaceable about the tilting shaft 62. In other words, the swivel case 12 is connected to the boat 16 to be displaceable to each other about the tilting shaft 62. As mentioned above, the swivel shaft (now assigned with reference numeral 64) is rotatably accommodated inside the swivel case 12. The swivel shaft 64 extends in the vertical direction and has its upper end fastened to a mount frame 66 and its lower end fastened to a lower mount center housing (not shown). The mount frame 66 and lower mount center housing are fastened to a frame on which the engine 18 and the propeller 24, etc., are mounted.

The electric motor 46 (for steer) and a gearbox (gear mechanism) 68 for reducing the rotational speed of the electric motor 46 are fastened to a portion above the swivel case 12. Horizontal steering of the outboard motor 10 is thus power-assisted using the rotational output of the electric motor 46 to swivel the mount frame 66 and thus turns the propeller 24 and rudder 26 about the vertical axis. The overall rudder turning angle (steerable angle) of the outboard motor 10 is 60 degrees, 30 degrees to the right and 30 degrees to the left.

The output of the engine 18 is transmitted, via the crankshaft (not shown) and the vertical shaft (drive shaft; now assigned with reference numeral 70), to the propeller shaft (now assigned with reference numeral 72) accommodated in the gear case 54, and rotates the propeller 24 that is fixed to the propeller shaft 72.

Figure 4:
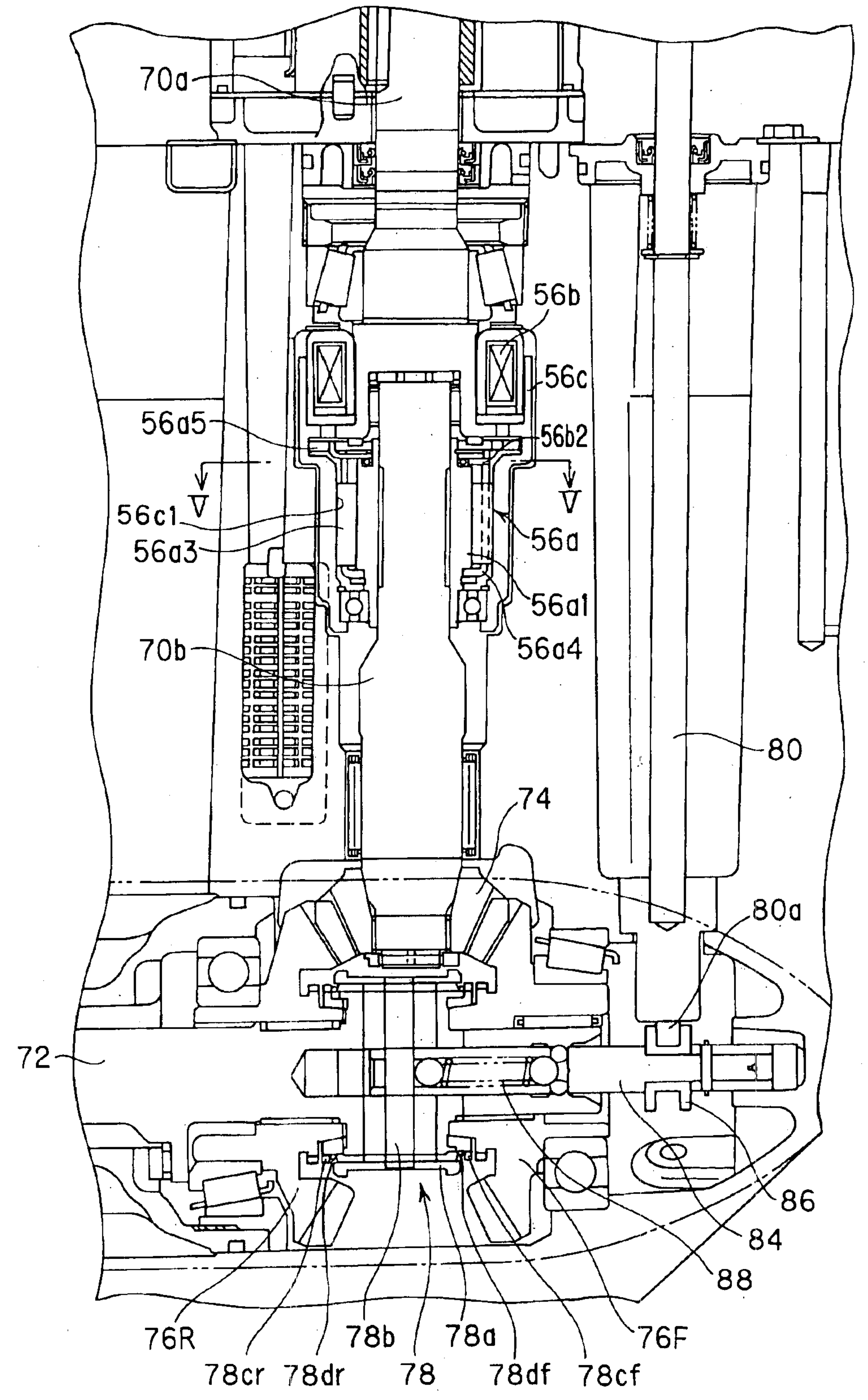
FIG. 4 is an enlarged sectional view of a gear case illustrated in FIG. 3.

FIG. 4 is an enlarged sectional view of the gear case 54 illustrated in FIG. 3.

As shown in the figure, the vertical shaft 70 is divided into a plurality of shaft members, i.e., divided into two shaft halves, i.e., a first shaft half 70*a* and a second shaft half 70*b*. The first and second shaft halves 70*a* and 70*b* are arranged to be coaxial with each other and are coupled by the electromagnetic clutch 56 to be connected or disconnected. The first shaft half 70*a* is connected to the crankshaft (not shown) to be rotatable by the output of the engine 18. On the other hand, the second shaft half 70*b* rotates only when connected to the first shaft half 70*a* by the electromagnetic clutch 56.

The electromagnetic clutch 56 includes a clutch section 56*a*, an electromagnet 56*b*, and a rotor 56*c* disposed to surround the clutch section 56*a* and the electromagnet 56*b*. The rotor 56*c* is fastened to the first shaft half 70*a* to be rotated therewith.

Figure 5:
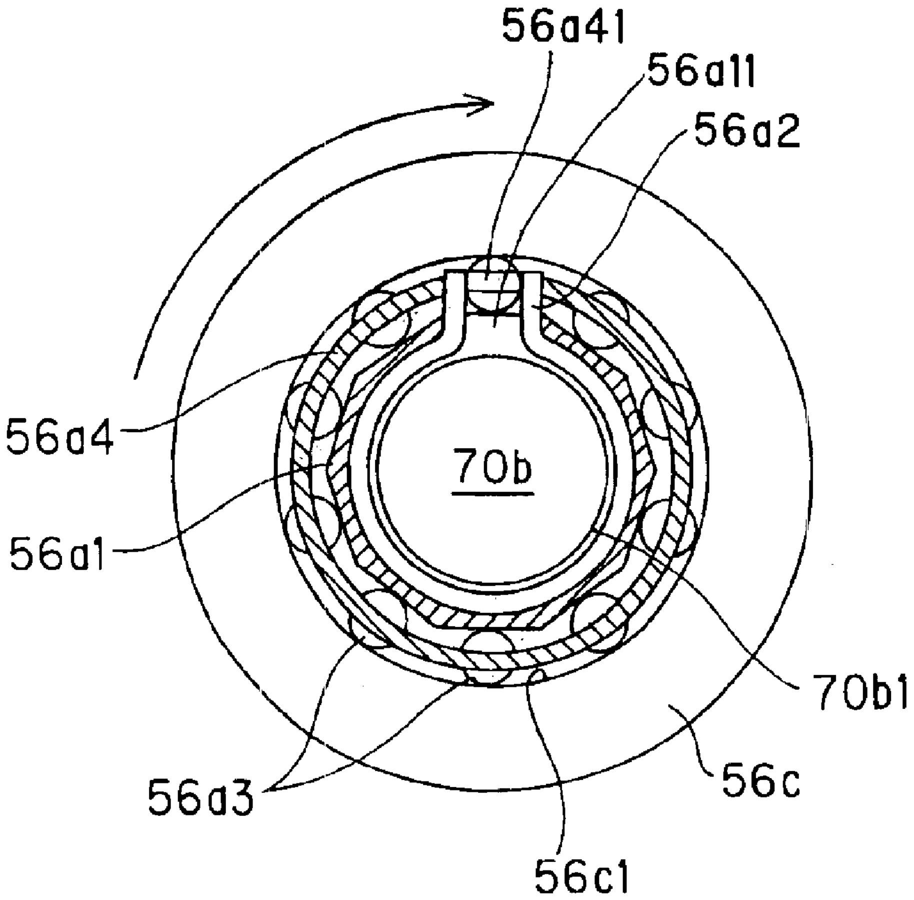
FIG. 5 is a cross-sectional view taken along the line V—V of FIG. 4.
Figure 6:
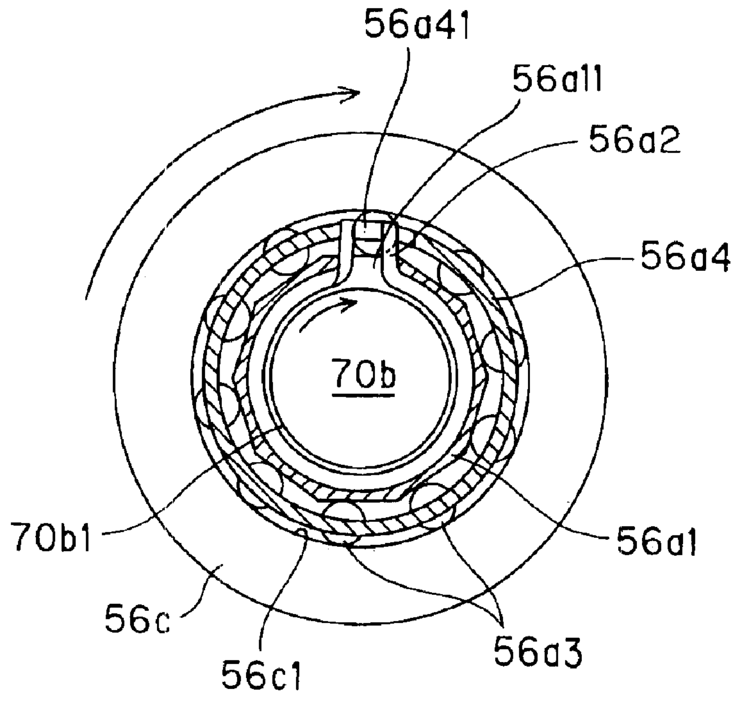
FIGS. 6 to 7 are views similar to FIG. 5.
Figure 7:
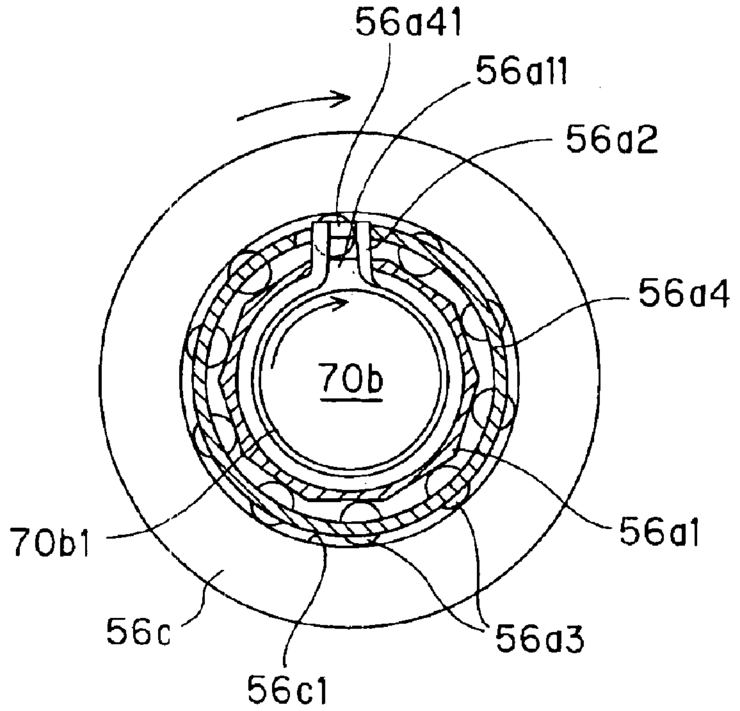

FIG. 5 is a cross-sectional view taken along the line V—V of FIG. 4. The arrow shown in the figure indicates the direction of rotation of the rotor 56*c* (i.e., that of the first shaft half 70*a*). FIGS. 6 to 7 are views similar to FIG. 5.

As shown in FIGS. 4 and 5, the clutch section 56*a* is installed in a space between an inner surface 56*c*1 of the rotor 56*c* (that located exterior of the second shaft half 70*b*) and an outer surface 70*b*1 of the second shaft half 70*b*. The clutch section 56*a* includes a cam ring 56*a*1 fastened to the outer surface 70*b*1 of the second shaft half 70*b*, a switch spring 56*a*2, ten rollers 56*a*3 disposed rotatably in a space between the cam ring 56*a*1 and the inner surface 56*c*1 of the rotor 56*c*, a retainer 56*a*4 retaining the ten rollers 56*a*3, and an armature 56*a*5 fixed to the retainer 56*a*4 and disposed in the proximity of the rotor 56*c*.

The cam ring 56*a*1 has a shape of regular decagon (in cross section) and is configured in such a manner that the maximum distance between each line segment and the rotor inner surface 56*c*1, i.e., the maximum distance between the middle point of each line segment and the rotor inner surface 56*c*1 is slightly larger than the diameter of each roller 56*a*3, and the difference between each vertex and the rotor inner surface 56*c*1 is slightly smaller than the diameter of each roller 56*a*3.

The cam ring 56*a*1 and the retainer 56*a*4 are formed with cutaways 56*a*11 and 56*a*41 in such a way that distal ends of the switch spring 56*a*2 are inserted into the cutaways to urge the cam ring 56*a*1 and the retainer 56*a*4 in predetermined positions. Specifically, the cam ring 56*a*1 and the retainer 56*a*4 are placed in the positions in such a manner that the rollers 56*a*3 are each disposed at the middle points of the line segments of the cam ring 56*a*1. Since the distance between the line segment middle points of the cam ring 56*a*1 and the rotor inner surface 56*c*1 is slightly larger than the diameter of the rollers 56*a*3 as mentioned above, the rollers 56*a*3 (disposed at the line segment middle points) can freely rotate and the rotation of the first shaft half 70*a* is not transmitted to the second shaft half 70*b*.

When the electromagnet 56*b* is supplied with current (i.e., when the clutch 56 is operated), the armature 56*a*5 is attracted to the rotor 56*c* and rotates with the rotor 56*c*. When the armature 56*a*5 rotates, the retainer 56*a*4 fastened thereto also rotates and as shown in FIG. 6, moves the rollers 56*a*3, against the biasing force of the switch spring 56*a*2, towards the vertexes of the cam ring 56*a*1 at the time of engine acceleration. Since the distance between the vertexes of the cam ring 56*a*1 and the rotor inner surface 56*c*1 is slightly smaller than the diameter of the rollers 56*a*3 as mentioned above, the rotor inner surface 56*c*1 is engaged (locked) with the vertexes of the cam ring 56*a*1 through the rollers 56*a*3 in response to the movement of the rollers 56*a*3 towards the vertexes. With this, the rotation of the first shaft half 70*a* is transmitted to the second shaft half 70*b*.

The rollers 56*a*3 continue to rotate (slip) until the rotor inner surface 56*c*1 engages with the vertexes of the cam ring 56*a*1 by the rollers 56*a*3 since the current supply to the armature 56*b*. With this, the rotation of the rotor inner surface 56*c*1, i.e., the rotation of the first shaft half 70*a* is gradually transmitted to the cam ring 56*a*1, i.e, to the second shaft half 70*b*. In other words, at the beginning of shift, the clutch section 56*a* is temporarily under a semi-clutch state. With this, even when the rotational speed difference between the first shaft half 70*a* and the second shaft half 70*b* is large, their engagement can be finished smoothly.

At the time of engine deceleration, in other words, when the rotational speed of the first shaft half 70*a* drops as the engine speed decreases and as a result, if the rotational speed of the second shaft half 70*b* exceeds that of the first shaft half 70*a*, as shown in FIG. 7, the rollers 56*a*3 move towards opposite vertexes (of the same line segments) of the cam ring 56*a*1 against the biasing force of the switch spring 56*a*2 such that the rotor inner surface 56*c*1 engages with the vertexes of the cam ring 56*a*1, in other words, the first shaft half 70*a* is rotated by the second shaft half 70*b*. Thus, the electromagnetic clutch 56 acts as a two-way clutch. In FIGS. 6 and 7, the arrow marked at the exterior of the rotor 56*c* indicates the direction of rotation of the rotor 56*c* (the direction of the first shaft half 70*a*), whilst the arrow marked at the interior of the second shaft half 70*b* indicates the direction of rotation of the second shaft half 70*b*.

Returning to the explanation of FIG. 4, a pinion gear 74 is fastened or fixed to the bottom end of the second shaft half 70*b*. A forward gear (bevel gear) 76F and a reverse gear (bevel gear) 76R are provided around the propeller shaft 72, respective of which meshes with the pinion gear 74 and are rotated in opposite directions. A synchromesh mechanism 78 is installed in a space between the forward gear 76F and the reverse gear 76R and rotates integrally with the propeller shaft 72.

The gear case 54 rotatably accommodates the shift rod (now assigned with reference numeral 80). As shown in FIG. 3, the shift rod 80 extends vertically, while penetrating the gear case 54 and the swivel case 12 (more precisely, the inside of the swivel shaft 64 accommodated in the swivel case 12), and reaches the inside of the engine cover 20 at its upper end. The upper end of the shift rod 80 is connected to the electric motor 50 through a group of reduction gears 82 installed in the engine cover 20. The shift rod 80 is formed with, at its lower end, a rod pin 80*a*. The rod pin 80*a* is inserted into a recess 86 formed on a shift slider 84 that is installed below the shift rod 80. The shift slider 84 is made slidable along a line extending from the propeller shaft 72, and is connected to the synchromesh mechanism 78 through a spring 88.

Figure 8:
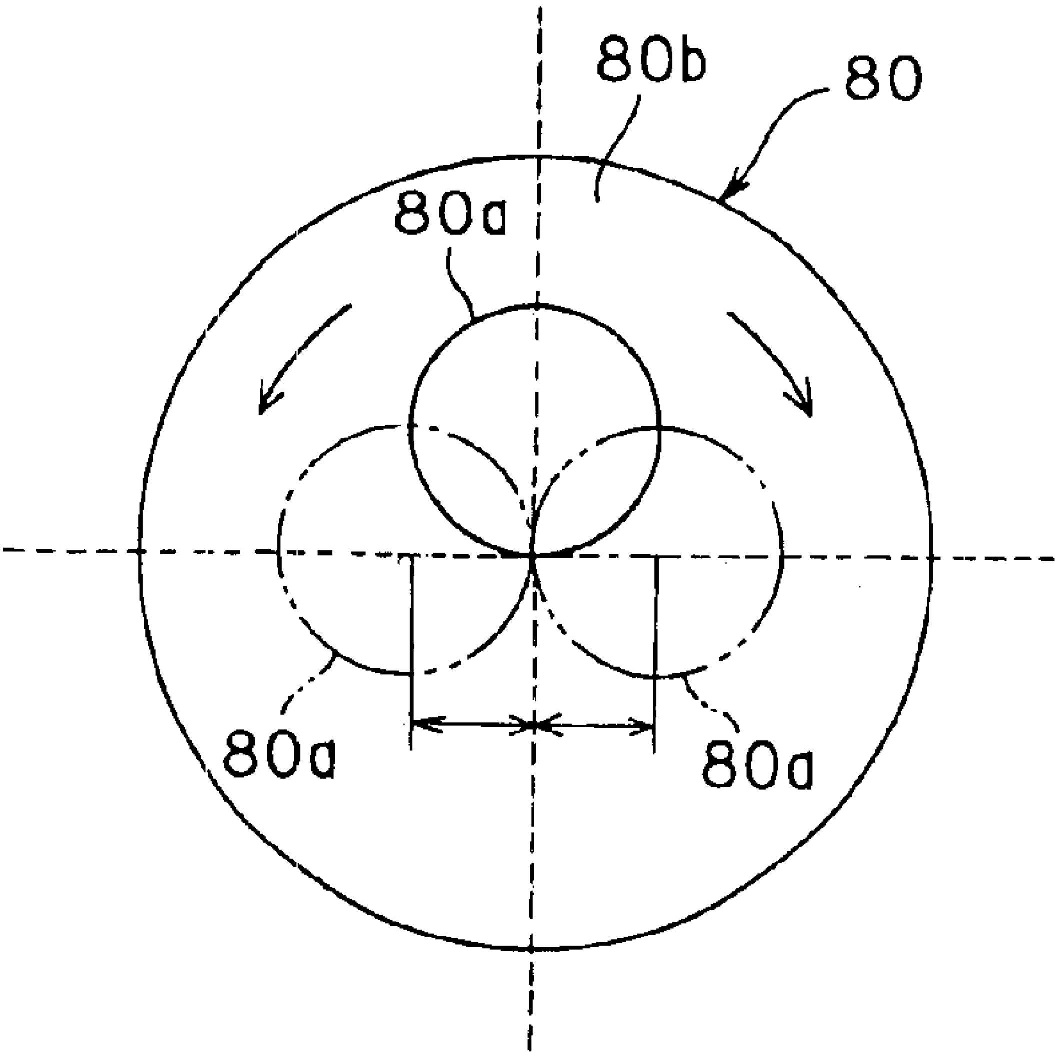
FIG. 8 is a bottom view of a shift rod illustrated in FIG. 4.

FIG. 8 is a bottom view of the shift rod 80 illustrated in FIG. 4.

As shown in the figure, the rod pin 80*a* is disposed on the end surface 80*b* of the shift rod 80 at a position eccentric to the rod center axis by a predetermined distance such that the rod pin 80*a* is displaced along the line extending from the propeller shaft 72 and the synchromesh mechanism 78 when the shift rod 80 is rotated. The displacement of the rod pin 80*a* is transmitted to the synchromesh mechanism 78 through the recess 86, the slider 84 and the spring 88.

As shown in FIG. 4, the synchromesh mechanism 78 includes a sleeve 78*a*, a pin 78*b* connected to the sleeve 78*a*, a forward block ring 78*cf* disposed near the forward gear 76F, a reverse block ring 78*cr* disposed near the reverse gear 76R, a forward synchro-spring 78*df* disposed in a space between the sleeve 78*a* and the forward block ring 78*cf*, and a reverse synchro-spring 78*dr* disposed in a space between the sleeve 78*a* and the reverse block ring 78*cr*.

The displacement of the rod pin 80*a* in response to the rotation of the shift rod 80 is transmitted to the pin 78*b* through the recess 86, the slider 84 and the spring 88 and moves the sleeve 78*a* in a direction of the forward gear 76F or the reverse gear 76R. Specifically, when the rod pin 80*a* is displaced in the direction of the forward gear 76F, the sleeve 78*a* is moved towards the upper portion of the forward block ring 78*cf* against the biasing force of the forward synchro-spring 78*df*. At that time, the forward block ring 78*cf* is pushed to the side surface of the forward gear 76F and they rotate together by the frictional force, thus generated. As the rod pin 80*a* is displaced further in that direction, the sleeve 78*a* meshes with the forward gear 76F, thereby enabling the forward gear 76F (drive side) to engage with the propeller shaft 72 (driven side) smoothly.

The above will also be applied to the engagement of the reverse gear 76R to the propeller shaft 72. Specifically, when the rod pin 80*a* is displaced in the direction of the reverse gear 76R, the sleeve 78*a* is moved towards the upper portion of the reverse block ring 78*cr* against the biasing force of the reverse synchro-spring 78*dr*, and causes the rotational speeds of the reverse block ring 78*cr* and the reverse gear 76R to be in synchronism with each other by the generated frictional force. And as the rod pin 80*a* is displaced further in that direction, the sleeve 78*a* meshes with the projections of the reverse gear 76R, thereby enabling the reverse gear 76R (drive side) to engage with the propeller shaft 72 (driven side).

The ECU 22 detects the position (including one among the neutral, forward and reverse) of the shift lever 36 manipulated by the operator, and controls the operation of the electric motor 50 and the electromagnetic clutch 56 in response to the detected position of the shift lever 36 (in response to the instruction to shift) to perform the shift as instructed.

Specifically, when the shift lever 36 is detected to be at the neutral position, the ECU 22 stops the supply of current to the electromagnet 56*b* of the electromagnetic clutch 56 to disconnect the first shaft half 70*a* from the second shaft half 70*b* and controls the operation of the electric motor 50 such that the rod pin 80*a* is at the neutral position, in other words, the sleeve 78*a* does not mesh either of the forward gear 76F or the reverse gear 76R, thereby preventing the output of the engine 16 from being transmitted to the propeller shaft 72.

When the shift lever 36 is detected to be at the forward position, the ECU 22 also first stops the supply of current to the electromagnet 56*b* of the electromagnetic clutch 56 to disconnect the first shaft half 70*a* from the second shaft half 70*b* and controls the operation of the electric motor 50 such that the rod pin 80*a* is at the forward position, in other words, the sleeve 78*a* meshes with the forward gear 76F. At this time, since the output of the engine 18 is not transmitted to the forward gear 76F, it becomes possible to quickly drop the rotational speed of the forward gear 76F to that of the sleeve 78*a* due to the synchronization effect of the synchromesh mechanism (i.e., due to the frictional force between the forward gear 76F and the forward block ring 78*cf*). Thus, it becomes possible to immediately synchronize the rotational speed of the forward gear 76F (drive side) to that of the propeller shaft 72 (sleeve 78*a*; driven side).

After the forward gear 76F has engaged with the propeller shaft 72, the ECU 22 supplies current to the electromagnet 56*b* of the electromagnetic clutch 56 to connect the first and second shaft halves 70*a* and 70*b* such that the output of the engine 18 is transmitted to the propeller shaft 72 and the boat 16 advances in the forward direction.

On the other hand, when the shift lever 36 is detected to be at the reverse position, the ECU 22 also first stops the supply of current to the electromagnet 56*b* of the electromagnetic clutch 56 to disconnect the first shaft half 70*a* from the second shaft half 70*b* and controls the operation of the electric motor 50 such that the rod pin 80*a* is at the reverse position, in other words, the sleeve 78*a* meshes with the reverse gear 76R. At this time, since the output of the engine 18 is not transmitted to the reverse gear 76R, it becomes also possible to quickly drop the rotational speed of the reverse gear 76R to that of the sleeve 78*a* due to the frictional force between the reverse gear 76R and the reverse block ring 78*cr*. Thus, it becomes possible to immediately synchronize the rotation of the reverse gear 76R (drive side) to that of the propeller shaft 72 (sleeve 78*a*; driven side).

After the reverse gear 76R has engaged with the propeller shaft 72, the ECU 22 supplies current to the electromagnet 56*b* of the electromagnetic clutch 56 to connect the first and second shaft halves 70*a* and 70*b* such that the output of the engine 18 is transmitted to the propeller shaft 72 and the boat 16 advances in the reverse direction As stated above, in the shift mechanism according to this embodiment, the vertical shaft 70 (that transmits the output of the engine 18 to the forward gear 76F or the reverse gear 76R) is divided into the first shaft half 70*a* and the second shaft half 70*b* to be coupled by the electromagnetic clutch 56, and the electromagnetic clutch 56 is operated in response to the instruction to shift. Specifically, when the forward gear 76F or the reverse gear 76R is to be engaged with the propeller shaft 72, since the electromagnetic clutch 56 is operated to disconnect the first shaft half 70*a* from the second shaft half 70*b*, it becomes possible to discontinue the transmission of the output of the engine 18 to the gear 76F or 76R at the beginning of shift.

With this, since the rotation of the drive side (gear 76F or 76R) can quickly be in synchronism with that of the driven side (propeller shaft 72), the impact (that may sometimes occur at gear-in, i.e., the beginning of shift) can be effectively decreased, thereby enabling to prevent the outboard motor 10 from vibrating and to avoid the drive train from suffering from excessive stress. Here, the drive train includes the crankshaft, the vertical shaft 70, the pinion gear 74, the forward and reverse gears 76F and 76R, and the propeller shaft 72, etc.

Further, since the forward gear 76F or the reverse gear 76R is engaged with the propeller shaft 72 through the synchromesh mechanism 78, whilst the electromagnetic clutch 56 is operated to disconnect the first shaft half 70*a* from the second shaft half 70*b*, the rotational speeds of the drive side and the driven side can be in synchronism with each other more quickly due to the synchronization effect of the synchromesh mechanism 78 (i.e., due to the frictional force between the forward block ring 78*cf* and the forward gear 76F or that between the reverse block ring 78*cr* and the reverse gear 76R). With this, the impact can be decreased more effectively and the vibration of the outboard motor 10 can be prevented more effectively.

Thus, the first embodiment is arranged to have a shift mechanism for an outboard motor 10 mounted on a stern of a boat 16 and having an internal combustion engine 18 at its upper portion and a propeller 24 at its lower portion that is powered by the engine to propel the boat, comprising: a propeller shaft 72 connected to the propeller; a forward gear 76F and a reverse gear 76R rotating the propeller shaft in a forward direction or in a reverse direction opposite to the forward direction, when engaged with the propeller shaft in response to a rotation of a shift rod 80; a vertical shaft 70 connected to the engine and transmitting an output of the engine to the propeller shaft through the forward gear or the reverse gear when the forward gear or the reverse gear is engaged to the propeller shaft; the vertical shaft being divided into a plurality of shaft members (i.e., the first shaft half 70*a* and the second shaft half 70*b*); an electromagnetic clutch 56 connecting/disconnecting the shaft members of the vertical shaft; a sensor (shift lever position sensor 38) generating a signal indicative of an instruction to shift inputted by an operator; and a controller (ECU 22) controlling the operation of the electromagnetic clutch in response to the instruction to shift such that one of the forward gear and the reverse gear corresponding to the instruction to shift is engaged with the propeller shaft.

In the shift mechanism, the controller controls to operate the electromagnetic clutch 56*b* to disconnect the vertical shaft members until the one of the forward gear and the reverse gear has been engaged with the propeller shaft, and then controls to operate the electromagnetic clutch to connect the vertical shaft members after the one of the forward gear and the reverse gear has been engaged with the propeller shaft.

The shift mechanism further includes; a synchromesh mechanism 78 having a sleeve 78*a* to be meshed with the forward gear or the reverse gear; and an actuator (electric motor 50) to rotate the shift rod; and wherein the controller controls to operate the actuator such that the sleeve 78*a* meshes with the one of the forward gear 76F and the reverse gear 76R. The shift rod 80 has a rod pin 80*a* that is displaced in response to the rotation of the shift rod such that the sleeve 78*a* meshes with the one of the forward gear and the reverse gear.

An outboard motor shift mechanism according to a second embodiment of the invention will now be explained with reference to the attached drawings.

Figure 9:
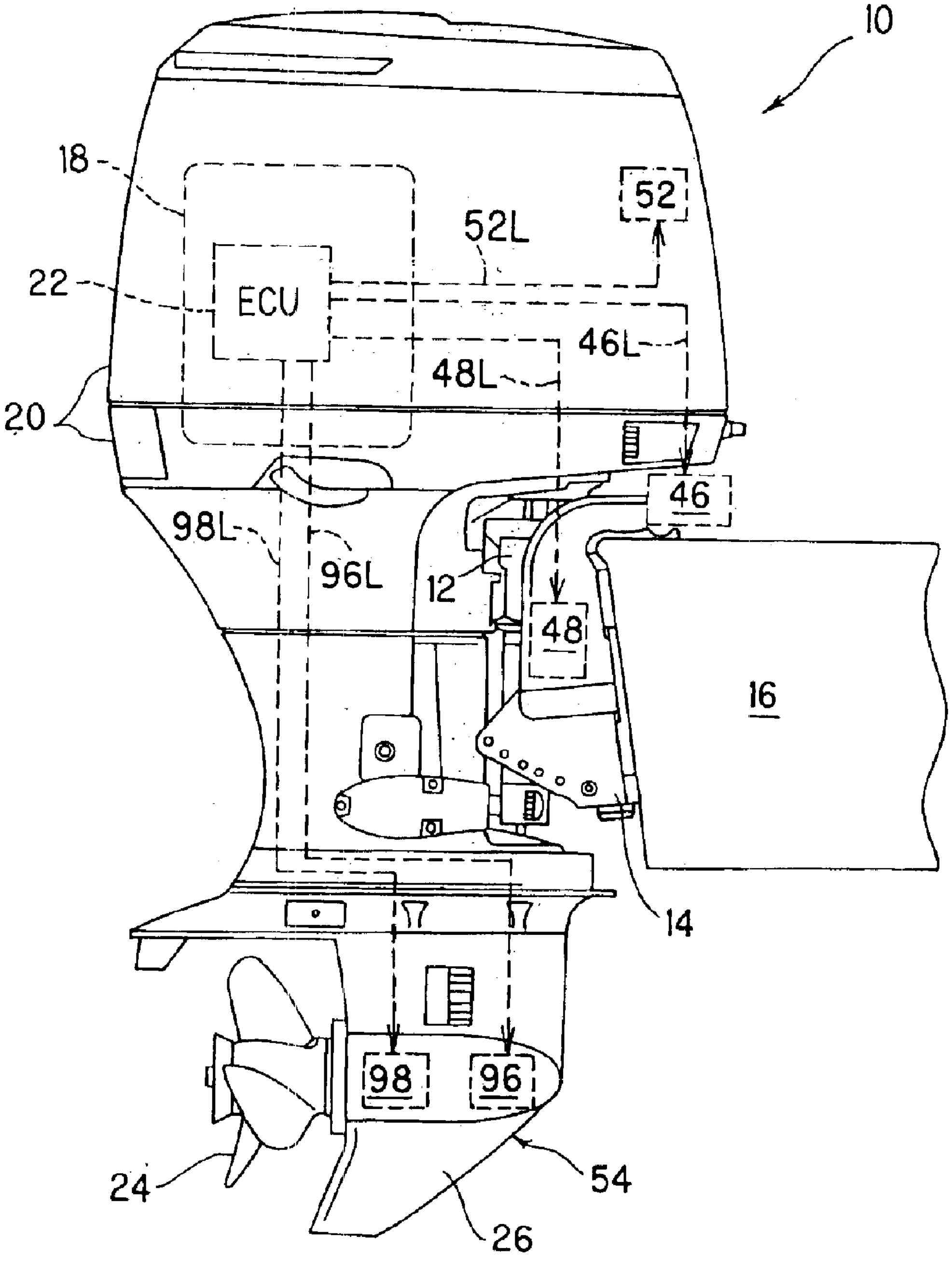
FIG. 9 is a view, similar to FIG. 2, but showing an outboard motor shift mechanism according to a second embodiment of the invention.
Figure 10:
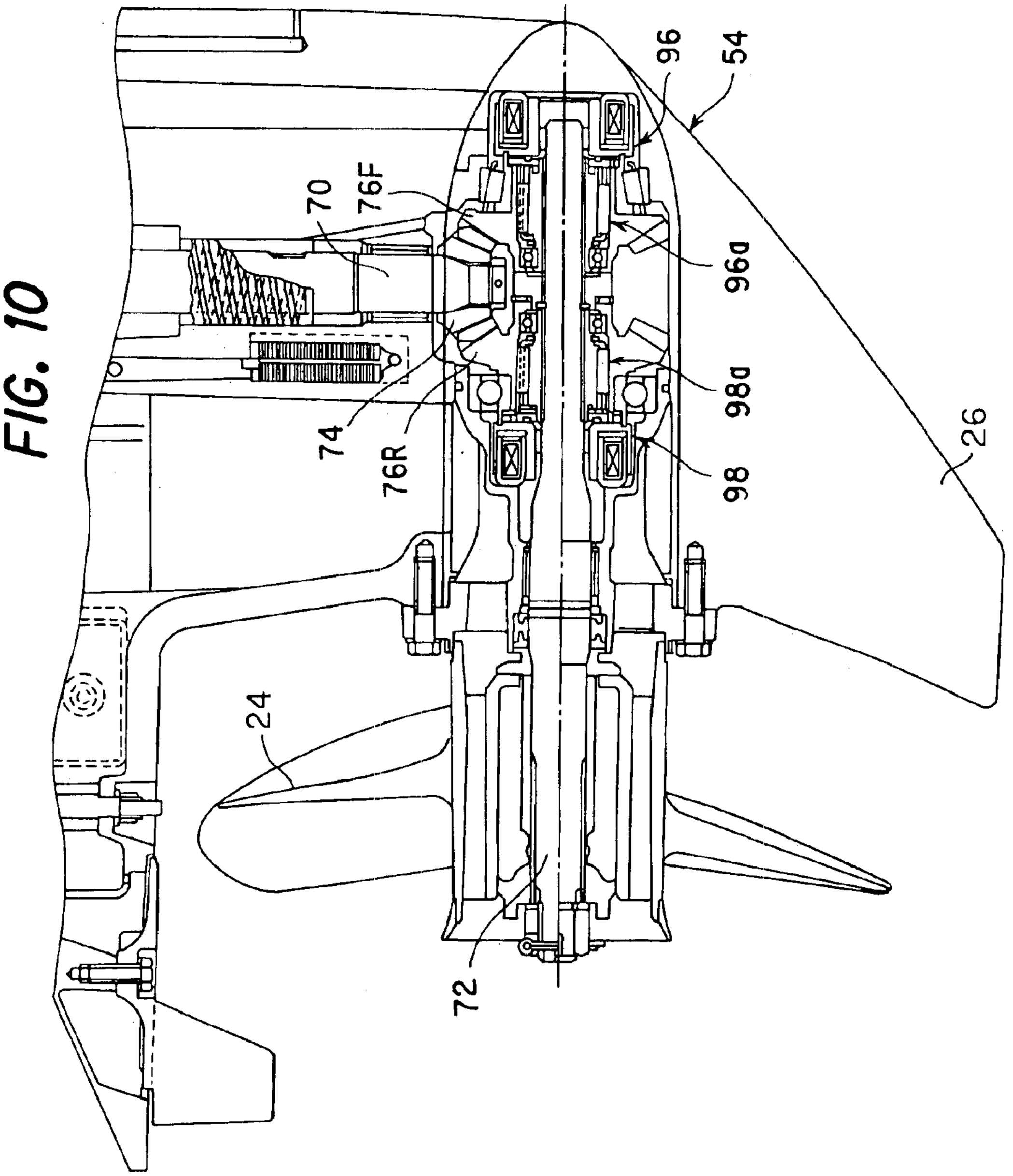
FIG. 10 is an enlarged partially-cutaway side view of a gear case illustrated in FIG. 9.

FIG. 9 is a view, similar to FIG. 2, but showing the outboard motor shift mechanism according to the second embodiment, FIG. 10 is an enlarged partially-cutaway side view of the gear case 54 illustrated in FIG. 9.

Explaining the second embodiment with focus on the difference from the first embodiment, in the shift mechanism according to the second embodiment, the vertical shaft 70 is made of a single shaft (not divided into two halves), and the synchromesh mechanism 78, the shift rod 80 and the electric motor 50 for shift are eliminated. Instead, two magnetic clutches are installed around the propeller shaft 72.

Specifically, as shown in the figures, around the propeller shaft 72 in the gear case 54, a forward (first) electromagnetic clutch 96 (hereinafter referred to as "forward clutch 96") is installed to engage the forward gear 76F with the propeller shaft 72, and a reverse (second) electromagnetic clutch 98 (hereinafter referred to as "reverse clutch 98") is installed to engage the reverse gear 76R to the propeller shaft 72. These clutches 96 and 98 are connected to the ECU 22 through signal lines 96L and 98L. More specifically, as best shown in FIG. 10, the forward gear 76F is rotatably carried around a clutch section 96*a* of the forward clutch 96, while the reverse gear 76R is rotatably carried around a clutch section 98*a* of the reverse clutch 98.

Figure 11:
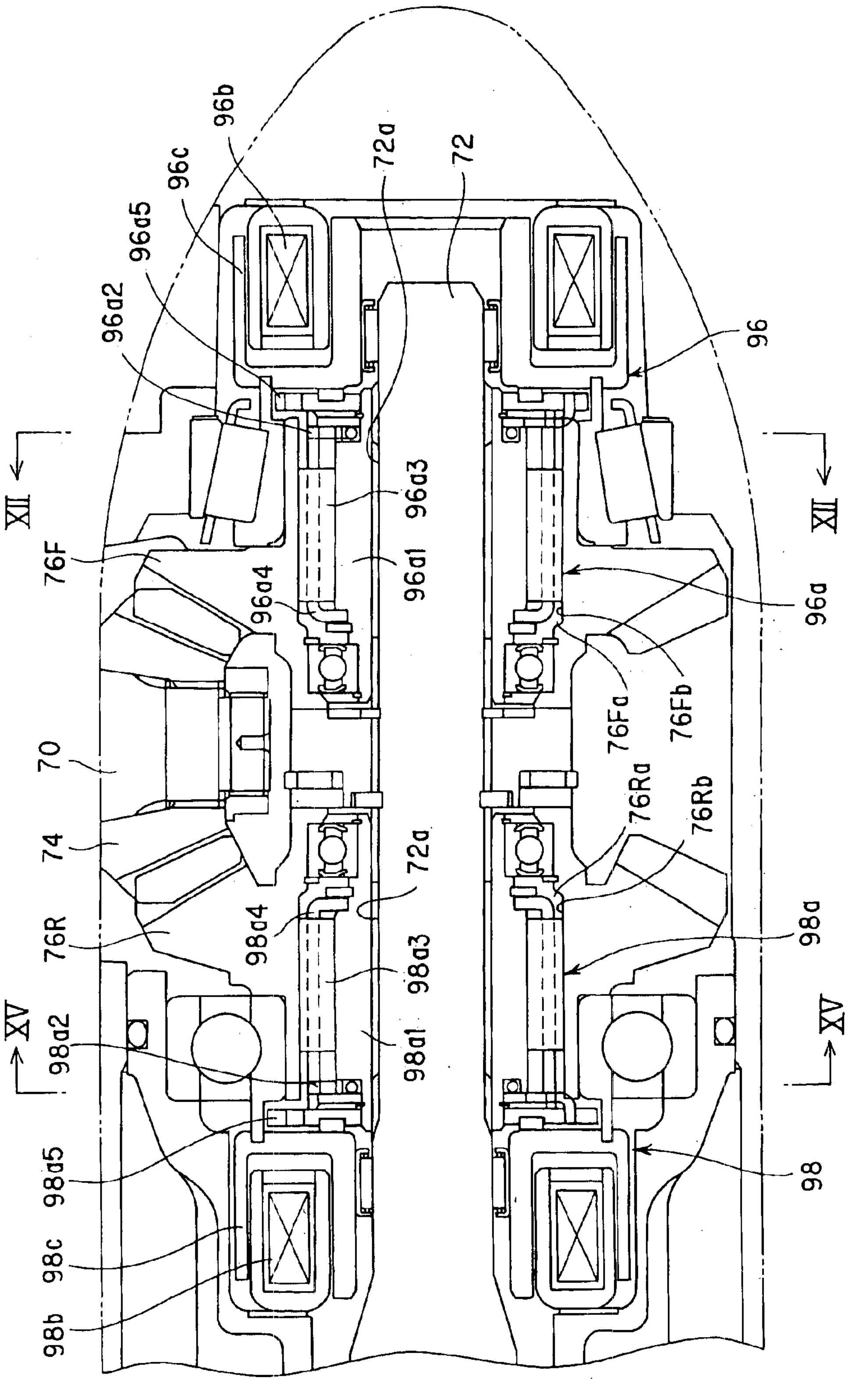
FIG. 11 is an enlarged view of parts around forward and reverse electromagnetic clutches illustrated in FIG. 10.

FIG. 11 is an enlarged view of portions around the forward and reverse clutches 96 and 98 illustrated in FIG. 10.

As illustrated in the figure, the pinion gear 74 is fastened to the vertical shaft 70 and similarly to the first embodiment, the forward and reverse gears 76F and 76R mesh with the pinion gear 74 to be rotated in the opposite directions. The output of the engine 18 is thus transmitted to the forward gear 76F or the reverse gear 76R via the vertical shaft 70 and the pinion gear 74, and is then transmitted to the propeller shaft 72 by the clutch section 96*a* of the forward clutch 96 or the clutch section 98*a* of the reverse clutch 98, thereby rotating the propeller 24 fastened to the propeller shaft 72 in a direction in which the boat 16 moves in the forward direction or in the reverse direction.

Explaining the forward and reverse clutches 96 and 98 in details, the forward clutch 96 includes the aforesaid clutch section 96*a* that mechanically engages the forward gear 76F to the propeller shaft 72, an electromagnet 96*b* disposed around the propeller shaft 72, and a rotor 96*c* disposed to enclose the electromagnet 96*b*. The rotor 96*c* is connected to the forward gear 76F and is rotated therewith. Similarly, the reverse clutch 98 includes the aforesaid clutch section 98*a* that also mechanically engages the reverse gear 76R to the propeller shaft 72, an electromagnet 98*b* disposed around the propeller shaft 72, and a rotor 98*c* disposed to enclose the electromagnet 98*b*. The rotor 98*c* is connected to the reverse gear 76R and is rotated therewith.

Figure 12:
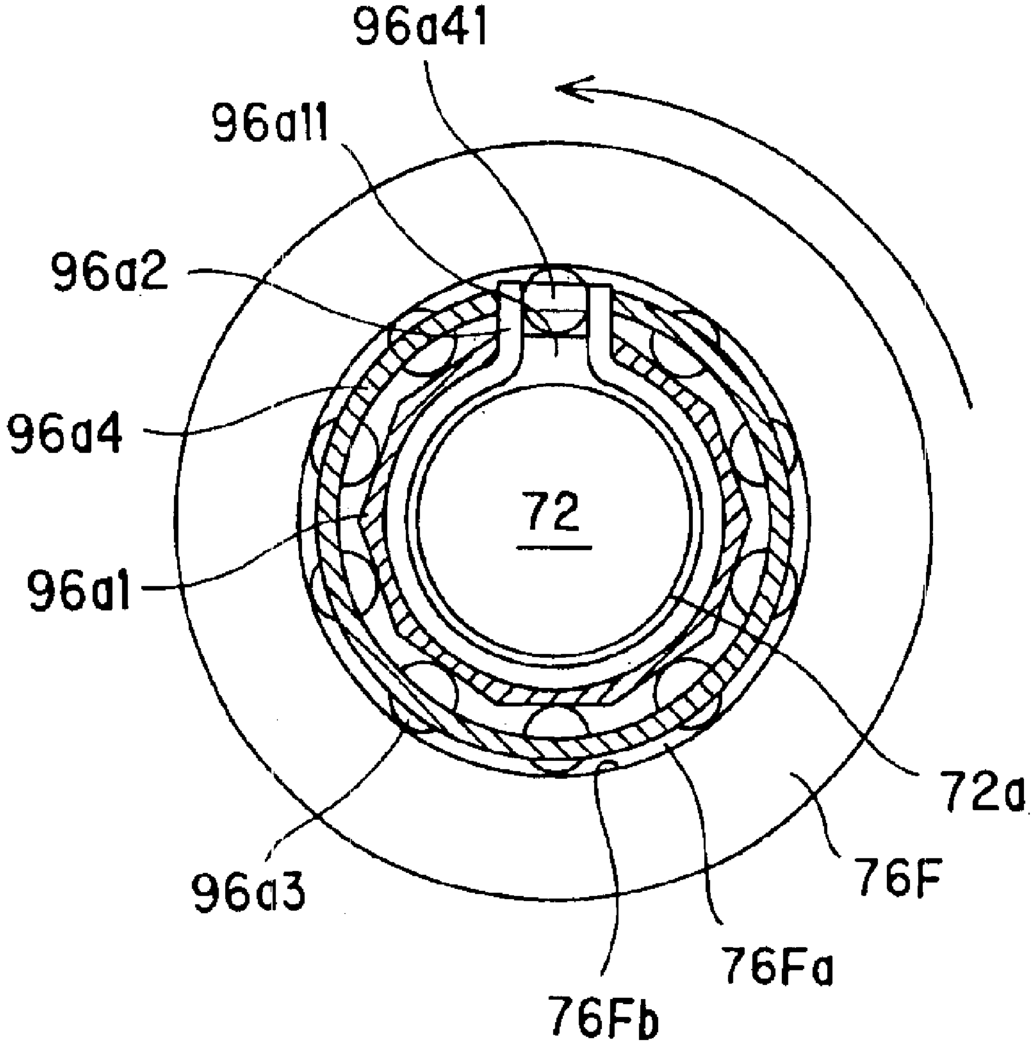
FIG. 12 is a cross-sectional view taken along the line of XII—XII.

FIG. 12 is a cross-sectional view taken along the line of XII—XII. The arrow depicted there indicates the direction of rotation of the forward gear 76F.

As shown in FIGS. 11 and 12, the forward gear 76F is bored and a central hole 76F*a* is formed therethrough to receive the propeller shaft 72. The clutch section 96*a* is disposed in a space between an inner surface 76F*b* of the hole 76F*a* and an outer surface 72*a* of the propeller shaft 72. The clutch section 96*a* includes a cam ring 96*a*1 fastened to the outer surface 72*a* of the propeller shaft 72, a switch spring 96*a*2, ten rollers 96*a*3 disposed rotatably in a space between the cam ring 96*a*1 and the inner surface 76F*b* of the hole 76F*a*, a retainer 96*a*4 retaining the ten rollers 96*a*3, and an armature 96*a*5 fixed to the retainer 96*a*4 and disposed in the proximity of the rotor 96*c*.

Similar to the first embodiment, the cam ring 96*a*1 has a shape of regular decagon (in cross section) and is configured in such a manner that the maximum distance between each line segment and the hole inner surface 76F*b*, i.e., the maximum distance between the middle point of each line segment and the hole inner surface 76F*b* is slightly larger than the diameter of each roller 96*a*3, and the difference between each vertex and the hole inner surface 76F*b* is slightly smaller than the diameter of each roller 96*a*3.

The cam ring 96*a*1 and the retainer 96*a*4 are formed with cutaways 96*a*11 and 96*a*41 in such a manner way that distal ends of the switch spring 96*a*2 are inserted into the cutaways to urge the cam ring 96*a*1 and the retainer 96*a*4 in predetermined positions. Specifically, the cam ring 96*a*1 and the retainer 96*a*4 are placed in the positions in such a manner that the rollers 96*a*3 are each disposed at the middle points of the line segments of the cam ring 96*a*1. Since the distance between the line segment middle points of the cam ring 96*a*1 and the hole inner surface 76F*b* is slightly larger than the diameter of the rollers 96*a*3 as mentioned above, the rollers 96*a*3 (disposed at the line segment middle points) can freely rotate and the rotation of the forward gear 76F is not transmitted to the propeller shaft 72.

Figure 13:
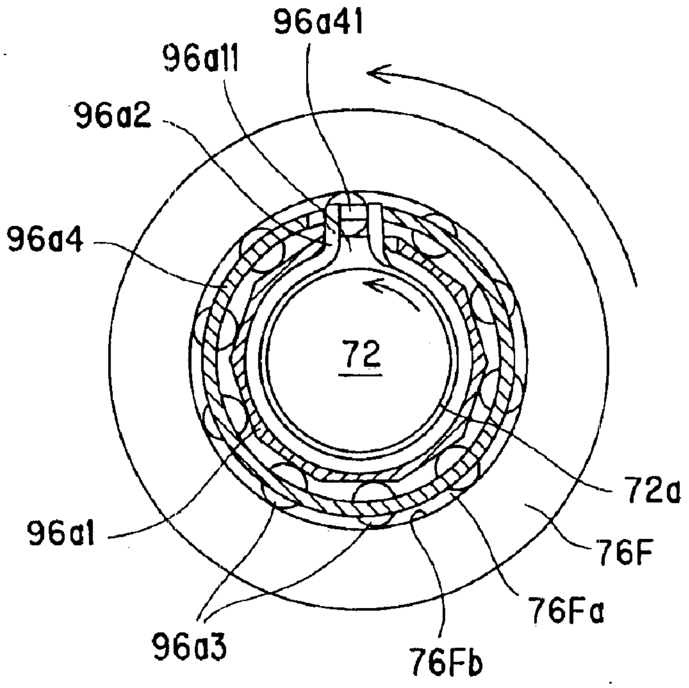
FIG. 13 is a view similar to FIG. 12, but showing a situation where the forward electromagnetic clutch is in operation (engine accelerated)

When the electromagnet 96*b* is supplied with current, the armature 96*a*5 is attracted to the rotor 96*c* and rotates with the rotor 96*c*. When the armature 96*a*5 rotates, the retainer 96*a*4 fastened thereto also rotates and as shown in FIG. 13, moves the rollers 96*a*3, against the biasing force of the switch spring 96*a*2, towards the vertexes of the cam ring 96*a*1 at the time of engine acceleration. Since the distance between the vertexes of the cam ring 96*a*1 and the hole inner surface 76F*b* is slightly smaller than the diameter of the rollers 96*a*3 as mentioned above, the hole inner surface 76F*b* is engaged (locked) with the vertexes of the cam ring 96*a*1 through the rollers 96*a*3 in response to the movement of the rollers 96*a*3 towards the vertexes. With this, the rotation of the forward gear 76F is transmitted to the propeller shaft 72.

The rollers 96*a*3 continue to rotate (slip) until the holes inner surface 76F*b* engages with the vertexes of the cam ring 96*a*1 by the rollers 96*a*3 since the current supply to the armature 96*a*5. With this, the rotation of the hole inner surface 76F*b*, i.e., the rotation of the forward gear 76F is gradually transmitted to the cam ring 96*a*1, i.e, to the propeller shaft 72. In other words, at the beginning of shift, the clutch section 96*a* is temporarily under a semi-clutch state. With this, even when the rotational difference between the forward gear 76F and the propeller shaft 72 is large, their engagement can be finished smoothly.

Figure 14:
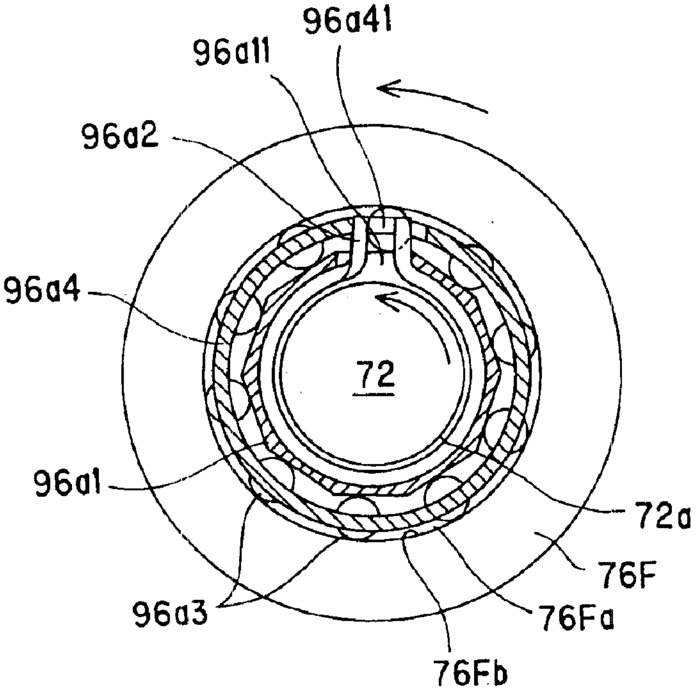
FIG. 14 is a view similar to FIG. 12, but showing a situation where the forward electromagnetic clutch is in operation (engine decelerated)

At the time of engine deceleration, in other words, when the rotational speed of the forward gear 76F drops as the engine speed decreases and as a result, if the rotational speed of the propeller shaft 72 exceeds that of the rotor 76*c*, as shown in FIG. 14, the rollers 96*a*3 move towards opposite vertex (of the same line segments) of the cam ring 96*a*1 against the biasing force of the switch spring 96*a*2 such that the hole inner surface 76F*b* engages with the vertexes of the cam ring 96*a*1, in other words, the forward gear 76F is rotated by the propeller shaft 72. Thus, the electromagnetic clutch 96 also acts as a two-way clutch. In FIGS. 13 and 14, the arrow marked at the exterior of the forward gear 76F indicates the direction of rotation of the forward gear 76F, whilst the arrow marked at the interior of the propeller shaft 72 indicates the direction of rotation of the propeller shaft 72.

The above will also be applied to the reverse clutch 98.

Figure 15:
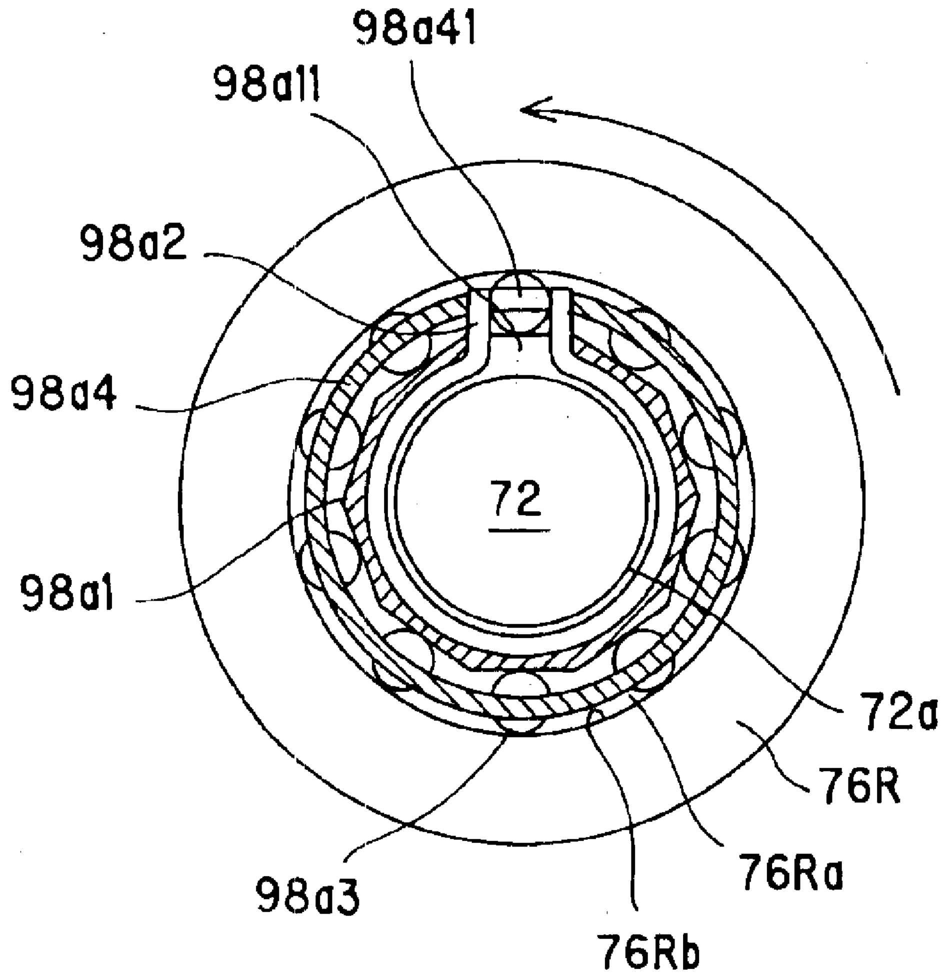
FIG. 15 is a cross-sectional view taken along the line of XV—XV.

FIG. 15 is a cross-sectional view taken along the line of XV—XV. The arrow depicted there indicates the direction of rotation of the reverse gear 76R.

As shown in FIGS. 11 and 15, the reverse gear 76R is also bored and a central hole 76R*a* is formed therethrough to receive the propeller shaft 72. The clutch section 98*a* is disposed in a space between an inner surface 76R*b* of the hole 76R*a* and the outer surface 72*a* of the propeller shaft 72. The clutch section 98*a* includes a cam ring 98*a*1 fastened to the outer surface 72*a* of the propeller shaft 72, a switch spring 98*a*2, ten rollers 98*a*3 disposed rotatably in a space between the cam ring 98*a*1 and the inner surface 76R*b* of the hole 76R*a*, a retainer 98*a*4 retaining the ten rollers 98*a*3, and an armature 98*a*5 fixed to the retainer 98*a*4 and disposed in the proximity of the rotor 98*c*.

Like the forward clutch 96, the cam ring 98*a*1 has a shape of regular decagon (in cross section) and is configured in such a manner that the maximum distance between each line segment and the hole inner surface 76R*b*, i.e., the maximum distance between the middle point of each line segment and the hole inner surface 76R*b* is slightly larger than the diameter of each roller 98*a*3, and the difference between each vertex and the hole inner surface 76R*b* is slightly smaller than the diameter of each roller 98*a*3.

The cam ring 98*a*1 and the retainer 98*a*4 are formed with cutaways 98*a*11 and 98*a*41 in such a manner that distal ends of the switch spring 98*a*2 are inserted into the cutaways to urge the cam ring 98*a*1 and the retainer 98*a*4 in predetermined positions. Specifically, the cam ring 98*a*1 and the retainer 98*a*4 are placed in the positions in such a manner that the rollers 98*a*3 are each disposed at the middle points of the line segments of the cam ring 98*a*1. Since the distance between the line segment middle points of the cam ring 98*a*1 and the hole inner surface 76R*b* is slightly larger than the diameter of the rollers 98*a*3 as mentioned above, the rollers 98*a*3 (disposed at the line segment middle points) can freely rotate and the rotation of the reverse gear 76R is not transmitted to the propeller shaft 72.

Figure 16:
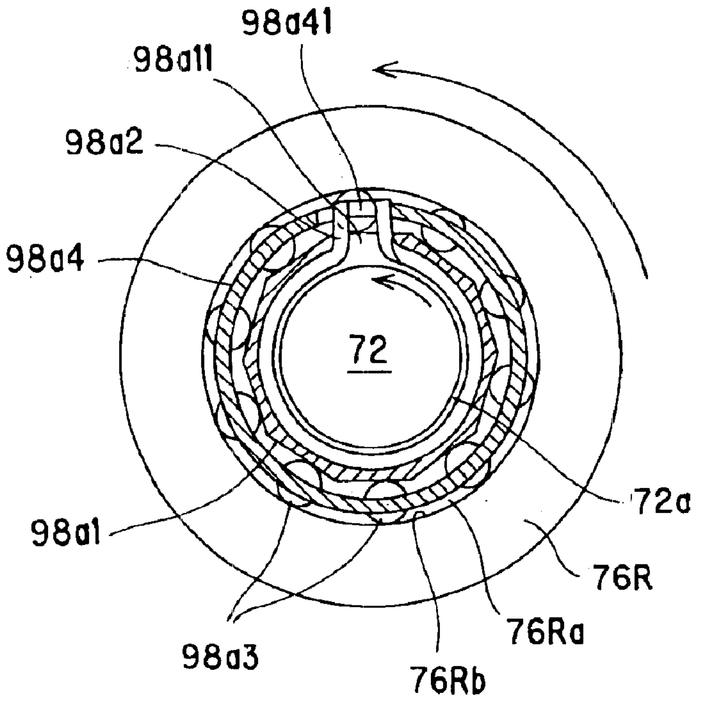
FIG. 16 is a view similar to FIG. 12, but showing a situation where the reverse electromagnetic clutch is in operation (engine accelerated)

When the electromagnet 98*b* is supplied with current, the armature 98*a*5 is attracted to the rotor 98*c* and rotates with the rotor 98*c*. When the armature 98*a*5 rotates, the retainer 98*a*4 fastened thereto also rotates and as shown in FIG. 16, moves the rollers 98*a*3, against the biasing force of the switch spring 98*a*2, towards the vertexes of the cam ring 98*a*1. Since the distance between the vertexes of the cam ring 98*a*1 and the hole inner surface 76R*b* is slightly smaller than the diameter of the rollers 98*a*3 as mentioned above, the hole inner surface 76R*b* is engaged (locked) with the vertexes of the cam ring 98*a*1 through the rollers 98*a*3 in response to the movement of the rollers 98*a*3 towards the vertexes. With this, the rotation of the reverse gear 76R is transmitted to the propeller shaft 72.

The rollers 98*a*3 continue to rotate (slip) until the holes inner surface 76R*b* engages with the vertexes of the cam ring 98*a*1 by the rollers 98*a*3 since the current supply to the armature 98*a*5. With this, the rotation of the hole inner surface 76R*b*, i.e., the rotation of the reverse gear 76R is gradually transmitted to the cam ring 98*a*1, i.e, to the propeller shaft 72. In other words, at the beginning of shift, the clutch section 98*a* is temporarily under a semi-clutch state. With this, even when the rotational speed difference between the reverse gear 76R and the propeller shaft 72 is large, their engagement can be finished smoothly.

Figure 17:
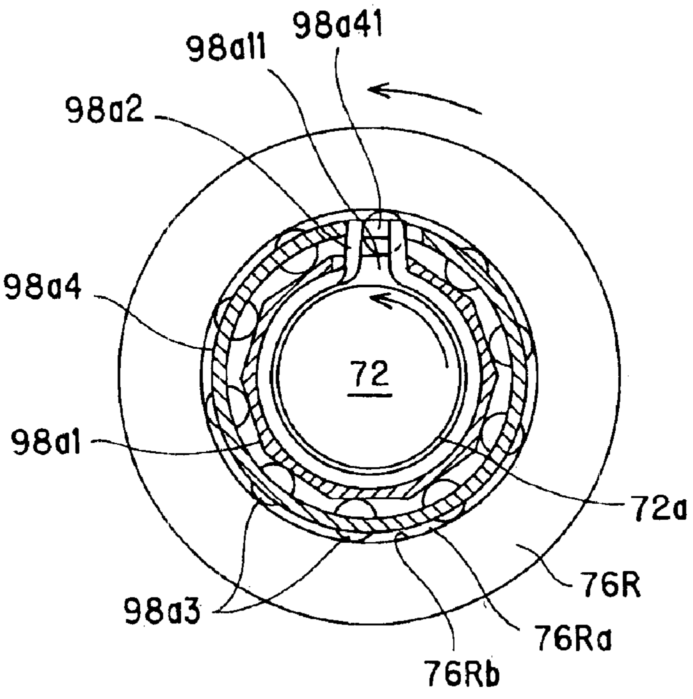
FIG. 17 is a view similar to FIG. 12, but showing a situation where the reverse electromagnetic clutch is in operation (engine decelerated).

At the time of deceleration, in other words, when the rotational speed of the reverse gear 76R drops as the engine speed decreases and as a result, if the rotational speed of the propeller shaft 72 exceeds that of the rotor 98*c*, as shown in FIG. 17, the rollers 98*a*3 move towards opposite vertex (of the same line segments) of the cam ring 98*a*1 against the biasing force of the switch spring 98*a*2 such that the hole inner surface 76R*b* engages with the vertexes of the cam ring 98*a*1, in other words, the reverse gear 76R is rotated by the propeller shaft 72. Thus, the electromagnetic clutch 98 also acts as a two-way clutch. In FIGS. 16 and 17, the arrow marked at the exterior of the reverse gear 76R indicates the direction of rotation of the reverse gear, whilst the arrow marked at the interior of the propeller shaft 72 indicates the direction of rotation of the propeller shaft 72.

In the shift mechanism according to the second embodiment, in response to the instruction to shift, the ECU 22 also controls the operation of the forward clutch 96 and the reverse clutch 98 to perform the shift as instructed.

Specifically, when the shift lever 36 is detected to be at the neutral position, the ECU 22 stops the supply of current to the electromagnets 96*b* and 98*b* of the forward and reverse clutches 96 and 98 to disconnect the forward and reverse gears 76F and 76R from the propeller shaft 72 so as the output of the engine 18 not to be transmitted to the propeller shaft 72.

When the shift lever 36 is detected to be at the forward position, the ECU 22 supplies current to the electromagnet 96*b* of the forward clutch 96 to connect the forward gear 76F with the propeller shaft 72, whilst it stops the supply of current to the electromagnet 98*b* of the reverse clutch 98 so as to disconnect the reverse gear 76R from the propeller shaft 72, in such a manner that the output of the engine 18 is transmitted to the propeller shaft 72 through the forward gear 76F such that the boat 16 advances in the forward direction.

On the other hand, when the shift lever 36 is detected to be at the reverse position, the ECU 22 supplies current to the electromagnet 98*b* of the reverse clutch 98 to connect the reverse gear 76R with the propeller shaft 72, whilst it stops the supply of current to the electromagnet 96*b* of the forward clutch 96 so as to disconnect the forward gear 76F from the propeller shaft 72, in such a manner that the output of the engine 18 is transmitted to the propeller shaft 72 through the reverse gear 76R such that the boat 16 advances in the reverse direction.

As stated above, in the shift mechanism according to the second embodiment, there are installed the forward clutch 96 to engage the forward gear 76F to the propeller shaft 72 and the reverse clutch 98 to engage the reverse gear 76R to the propeller shaft 72 and one of the clutches 96 and 98 is operated in response to the instruction to shift to engage the corresponding gear with the propeller shaft 72, such that the clutch sections 96*a* and 98*a* are under a semi-clutch state at the beginning of shift.

With this, since the rotation of the drive side (gear 76F or 76R) can quickly be in synchronism with that of the driven side (propeller shaft 72), the impact (that may sometimes occur at gear-in, i.e., the beginning of shift) can be effectively decreased, thereby enabling to prevent the outboard motor from vibrating and to avoid the drive train from suffering from excessive stress. Here, the drive train includes the crankshaft, the vertical shaft 70, the pinion gear 74, the forward and reverse gears 76F and 76R, and the propeller shaft 72, etc.

Further, since this arrangement needs no additional movable members such as a cable, a link mechanism and even the shift rod that cause plays to occur, it becomes possible to improve the operation feeling and facilitate maintenance, while avoiding a problem regarding space utilization.

Further, the forward and reverse gears 76F and 76R are bored to form the central holes 76F*a* and 76R*a* that receive the propeller shaft 72, whilst the forward and reverse gears 76F and 76R are rotatably carried around the propeller shaft 72, such that the clutch sections 96*a* and 98*a* are disposed in the spaces between the hole inner surfaces 76F*b* and 76R*b* and the outer surface 72*a* of the propeller shaft 72. In other words, since these clutches 96 and 98 are disposed integrally with the forward and reverse gears 76F and 76R, it becomes possible to utilize the space in the outboard motor 10 more effectively.

The rest of the second embodiment as well as the advantages and effects is the same as that of the first embodiment.

The second embodiment is thus arranged to have a shift mechanism for an outboard motor 10 mounted on a stern of a boat 16 and having an internal combustion engine 18 at its upper portion and a propeller 24 at its lower portion that is powered by the engine to propel the boat, comprising: a propeller shaft 72 connected to the engine and the propeller; a forward gear 76F and a reverse gear 76R rotating the propeller shaft in a forward direction or in a reverse direction opposite to the forward direction, when engaged with the propeller shaft; a first electromagnetic clutch 96 engaging the forward gear with the propeller shaft; a second electromagnetic clutch 98 engaging the reverse gear with the propeller shaft; a sensor (shift lever position sensor 38) generating a signal indicative of an instruction to shift inputted by an operator; and a controller (ECU 22) controlling to operate the first and second electromagnetic clutches in response to the instruction to shift such that one of the forward gear and the reverse gear corresponding to the instruction to shift is engaged with the propeller shaft.

In the shift mechanism, forward gear 76F and the reverse gear 76R are disposed around the propeller shaft 72 and are being bored to have central holes 76F*a*, 76R*a* in such a manner that clutch sections 96*a* and 98*a* of the first and second electromagnetic clutches 96 and 98 are each installed in a space made between an inner surface 76F*b* and 76R*b* of the hole and an outer surface 72*a* of the propeller shaft 72.

In the shift mechanism, each of the clutch sections of the first and second electromagnetic clutches includes: a cam ring 96*a*1., 98*a*1 fastened to the outer surface of the propeller shaft; and a plurality of rollers 96*a*3, 98*a*3 rotatably disposed in a space between the cam ring and the inner surface of the hole; and one of the first and second electromagnetic clutches associated with the one of the forward gear and the reverse gear corresponding to the instruction to shift, when operated, transmitting a rotation of the inner surface of the hole to the cam ring by engaging the cam ring with the inner surface of the hole. The one of the first and second electromagnetic clutches 96 or 98 gradually transmits the rotation of the inner surface of the hole to the cam ring until the cam ring has been engaged with the inner surface of the hole after operated at a beginning of shift.

It should be noted in the above, although the electric motor (for shift) 50 is used as the actuator, it is alternatively possible to use other actuators such as a hydraulic cylinder.

Japanese Patent Application Nos. 2003-070615 and 2003-070616 both filed on Mar. 14, 2003, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A shift mechanism for an outboard motor mounted on a stern of a boat and having an internal combustion engine at its upper portion and a propeller at its lower portion that is powered by the engine to propel the boat, comprising:

a propeller shaft connected to the propeller;

a forward gear and a reverse gear rotating the propeller shaft in a forward direction or in a reverse direction opposite to the forward direction, when engaged with the propeller shaft in response to a rotation of a shift rod;

a vertical shaft connected to the engine and transmitting an output of the engine to the propeller shaft through the forward gear or the reverse gear when the forward gear or the reverse gear is engaged to the propeller shaft; the vertical shaft being divided into a plurality of shaft members;

an electromagnetic clutch connecting/disconnecting the shaft members of the vertical shaft;

a sensor generating a signal indicative of an instruction to shift inputted by an operator; and a controller controlling the operation of the electromagnetic clutch in response to the instruction to shift such that one of the forward gear and the reverse gear corresponding to the instruction to shift is engaged with the propeller shaft.

2. The shift mechanism according to claim 1, wherein the controller controls to operate the electromagnetic clutch to disconnect the vertical shaft members until the one of the forward gear and the reverse gear has been engaged with the propeller shaft, and then controls to operate the electromagnetic clutch to connect the vertical shaft members after the one of the forward gear and the reverse gear has been engaged with the propeller shaft.

3. The shift mechanism according to claim 2, further including;

a synchromesh mechanism having a sleeve to be meshed with the forward gear or the reverse gear; and an actuator to rotate the shift rod;

and wherein the controller controls to operate the actuator such that the sleeve meshes with the one of the forward gear and the reverse gear.

4. The shift mechanism according to claim 3, wherein the shift rod having a rod pin that is displaced in response to the rotation of the shift rod such that the sleeve meshes with the one of the forward gear and the reverse gear.

5. A shift mechanism for an outboard motor mounted on a stern of a boat and having an internal combustion engine at its upper portion and a propeller at its lower portion that is powered by the engine to propel the boat, comprising:

a propeller shaft connected to the engine and the propeller;

a forward gear and a reverse gear rotating the propeller shaft in a forward direction or in a reverse direction opposite to the forward direction, when engaged with the propeller shaft;

a first electromagnetic clutch engaging the forward gear with the propeller shaft;

a second electromagnetic clutch engaging the reverse gear with the propeller shaft;

a sensor generating a signal indicative of an instruction to shift inputted by an operator; and a controller controlling to operate the first and second electromagnetic clutches in response to the instruction to shift such that one of the forward gear and the reverse gear corresponding to the instruction to shift is engaged with the propeller shaft.

6. The shift mechanism according to claim 5, wherein the forward gear and the reverse gear are disposed around the propeller shaft and are being bored to have central holes in such a manner that clutch sections of the first and second electromagnetic clutches are each installed in a space made between an inner surface of the hole and an outer surface of the propeller shaft.

7. The shift mechanism according to claim 6, wherein each of the clutch sections of the first and second electromagnetic clutches including:

a cam ring fastened to the outer surface of the propeller shaft; and a plurality of rollers rotatably disposed in a space between the cam ring and the inner surface of the hole;

and one of the first and second electromagnetic clutches associated with the one of the forward gear and the reverse gear corresponding to the instruction to shift, when operated, transmitting a rotation of the inner surface of the hole to the cam ring by engaging the cam ring with the inner surface of the hole.

8. The shift mechanism according to claim 7, wherein the one of the first and second electromagnetic clutches gradually transmits the rotation of the inner surface of the hole to the cam ring until the cam ring has been engaged with the inner surface of the hole after operated at a beginning of shift.

* * * * *